(12) United States Patent
Rozas (10) Patent No.: US 7,376,798 B1
(45) Date of Patent: May 20, 2008

(54) MEMORY MANAGEMENT METHODS AND SYSTEMS THAT SUPPORT CACHE CONSISTENCY

(75) Inventor: Guillermo J. Rozas, Los Gatos, CA (US)

(73) Assignee: Transmeta Corporation, Santa Clara, CA (US)

( * ) Notice: Subject to any disclaimer, the term of this patent is extended or adjusted under 35 U.S.C. 154(b) by 237 days.

(21) Appl. No.: 11/102,127

(22) Filed: Apr. 7, 2005

(51) Int. Cl.
*G06F 12/00* (2006.01)

(52) U.S. Cl. .............. 711/144; 711/141; 711/145; 711/130; 711/118; 711/133; 710/22

(58) Field of Classification Search .............. 711/118, 711/130, 133, 134, 141, 144, 145, 146
See application file for complete search history.

(56) References Cited

U.S. PATENT DOCUMENTS

| | | | | |
|---|---|---|---|---|
| 5,428,761 A | * | 6/1995 | Herlihy et al. | 711/130 |
| 5,701,432 A | * | 12/1997 | Wong et al. | 711/130 |
| 5,974,438 A | * | 10/1999 | Neufeld | 718/104 |
| 6,006,299 A | * | 12/1999 | Wang et al. | 710/108 |
| 6,263,407 B1 | * | 7/2001 | Arimilli et al. | 711/144 |
| 6,625,694 B2 | * | 9/2003 | Masri et al. | 711/133 |
| 6,658,536 B1 | * | 12/2003 | Arimilli et al. | 711/141 |
| 6,938,130 B2 | * | 8/2005 | Jacobson et al. | 711/144 |

* cited by examiner

*Primary Examiner*—Donald Sparks
*Assistant Examiner*—Alan M Otto (57) ABSTRACT

Methods and systems for maintaining cache consistency are described. A group of instructions is executed. The group of instructions can include multiple memory operations, and also includes an instruction that when executed causes a cache line to be accessed. In response to execution of that instruction, an indicator associated with the group of instructions is updated to indicate that the cache line has been accessed. The cache line is indicated as having been accessed until execution of the group of instructions is ended.

28 Claims, 5 Drawing Sheets

31
EXECUTE A 1st GROUP OF INSTRUCTIONS THAT INCLUDES MULTIPLE MEMORY OPERATIONS

32
ACCESS (e.g., READ, WRITE, etc.) A CACHE LINE BECAUSE OF AN INSTRUCTION IN THE 1st GROUP

33
CHANGE AN INDICATOR (e.g., SET AN OBSERVED BIT) ASSOCIATED WITH THE CACHE LINE TO INDICATE THE CACHE LINE HAS BEEN ACCESSED

34
EXECUTE A 2nd GROUP OF INSTRUCTIONS ON AN EXTERNAL AGENT (e.g., ANOTHER CPU OR A DMA DEVICE)

35
SEEK ACCESS TO THE CACHE LINE BECAUSE OF AN INSTRUCTION IN THE 2nd GROUP

CONTINUE (SEE FIG. 4)

MEMORY MANAGEMENT METHODS AND SYSTEMS THAT SUPPORT CACHE CONSISTENCY

BACKGROUND OF THE INVENTION

1. Field of the Invention

Embodiments of the present invention relate to computer system memory, in particular the management of cache memory.

2. Related Art

With direct memory access (DMA), an input/output (I/O) system can issue read requests and writes directly to main memory without passing through the central processing unit (CPU). However, if the I/O system uses DMA to write to main memory, and changes data cached previously by the CPU, then the CPU will not receive the new data unless the CPU fetches the data from main memory. Also, for DMA reads, the CPU cache may contain more recent data than main memory, and so the I/O system will not receive the new data unless it reads the cache instead of main memory. Multiprocessor systems, particularly systems referred to as shared-memory simultaneous multiprocessor (SMP) architectures, have to deal with similar types of scenarios. The MESI (Modified, Exclusive, Shared, Invalid) protocol is a popular cache consistency (coherency) protocol that addresses these issues. A modification of the MESI protocol is the MOESI (Modified, Owned, Exclusive, Shared, Invalid) protocol. These protocols are known in the art.

Constraints are also applied to memory operations to prevent processors and DMA systems from reordering memory operations at will. If, for example, each processor could reorder memory operations for optimization, code sequences that work on a single processor would not work on multiprocessor systems. One type of constraint can be referred to as sequential consistency. With sequential consistency, the legal orders of memory operations are those that are indistinguishable from strict interleaving of the operations from each thread of control. For example, for two threads, the operations of one thread can be interleaved with those of the other thread, but the order of operations within each thread is preserved.

There are different classes of high-level processor architectures with regard to operation reordering, optimization and speculation. One such class can be referred to as a lumped in-order architecture, and another such class as a lumped out-of-order architecture. With lumped in-order architectures, instructions are lumped into instruction groups that can be committed and rolled back atomically. Different instruction groups are committed sequentially and in order, but within an instruction group, arbitrary reordering and optimization can occur. Full speculation is possible within an instruction group, but speculation, reordering and optimization across instruction groups is limited. With lumped out-of-order architectures, instructions are lumped into instruction groups that can be committed and rolled back atomically. Different groups can execute out of order but are committed in order.

SUMMARY OF THE INVENTION

A method or system that can maintain sequential consistency for lumped (in-order or out-of-order) architectures would be advantageous. Prior attempts to achieve a sequentially consistent, lumped architecture are limited with respect to the number of memory operations that can be included in an instruction group. Specifically, such attempts are limited to a single memory operation per instruction group. Embodiments in accordance with the present invention overcome this disadvantage.

According to one embodiment of the present invention, a group of instructions is executed. The group of instructions can include multiple memory operations, and also includes an instruction that when executed causes a cache line to be accessed (e.g., read, write, store, load, etc.). In response to execution of that instruction, an indicator associated with the group of instructions is updated to indicate that the cache line has been accessed. The cache line is indicated as having been accessed until execution of the group of instructions is ended. If an external agent (e.g., another processor or a DMA system) snoops the cache and the cache line (or any other cache line in the cache, for that matter) is indicated as having been accessed, then the instruction group is rolled back and reissued. If an external agent (e.g., another processor or a DMA system) snoops the cache and no cache line is indicated as having been accessed, then the snoop can be processed using a conventional cache coherency protocol (MESI, for example).

BRIEF DESCRIPTION OF THE DRAWINGS

The accompanying drawings, which are incorporated in and form a part of this specification, illustrate embodiments of the present invention and, together with the description, serve to explain the principles of the invention. The drawings referred to in this description should not be understood as being drawn to scale except if specifically noted.

DETAILED DESCRIPTION OF THE INVENTION

Reference will now be made in detail to the various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "executing," "changing," "using," "accessing," "handling," "rolling back," "maintaining," "eliminating," "setting," "clearing," "incrementing," "decrementing," "associating," "granting," "determining" or the like, refer to the action and processes (e.g., flowcharts 30, 40 and 50 of FIGS. 3, 4 and 5, respectively) of a computer system or similar intelligent electronic computing device (generally, a controller), that manipulates and transforms data represented as physical (electronic) quantities within the computer system's registers and memories into other data similarly represented as physical quantities within the computer system memories or registers or other such information storage, transmission or display devices.

Figure 1:
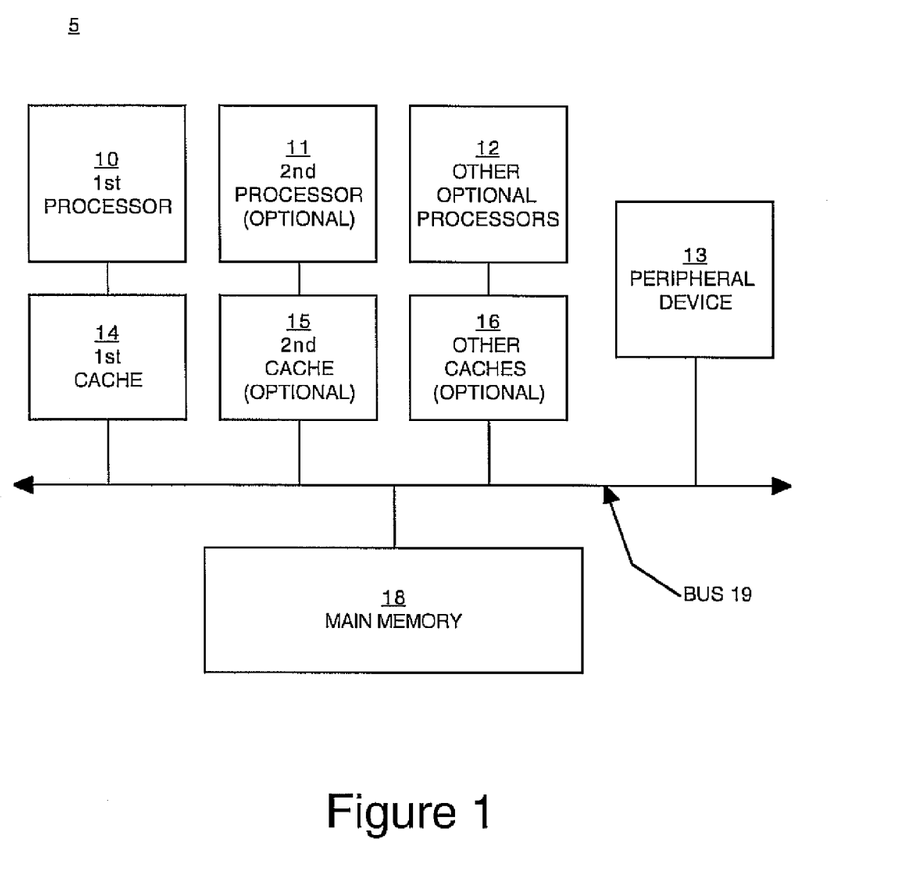
FIG. 1 is a block diagram of a portion of a computer system upon which embodiments of the present invention can be implemented.

FIG. 1 is a block diagram of a portion of a computer system 5 upon which embodiments of the present invention can be implemented. Computer system 5 can include elements in addition to those illustrated in FIG. 1. Generally speaking, embodiments in accordance with the present invention pertain to a computer system (or similar electronic device) that includes a processor, a main memory, a cache associated with the processor, and one or more external agents that can access the main memory and the processor's cache.

In the example of FIG. 1, computer system 5 includes a first processor 10, an optional second processor 11, and other optional processors 12 that are coupled to main memory 18 via bus 19. In the present embodiment, computer system 5 also includes a peripheral device 13 coupled to main memory 18 via bus 19. For ease of discussion, the processors 10, 11 and 12 and the peripheral device 13 may be collectively referred to herein as agents 10-13. Relative to processor 10, processors 11 and 12 and peripheral device 13 may be referred to as external agents; relative to processor 11, processors 10 and 12 and peripheral device 13 may be referred to as external agents; and so on.

In one embodiment, peripheral device 13 is capable of direct memory access (DMA). In general, DMA refers to a hardware circuit or software agent that can transfer data directly to or from main memory 18.

Associated with the processors 10-12 are first cache 14, optional second cache 15, and other optional caches 16, respectively. In one embodiment, each of the processors 10-12 has their own cache. The caches may be physically incorporated into the processors 10-12, or they may be physically external to the processors 10-12. In the present embodiment, each of the processors 10-12 can access each of the caches 14, 15 and 16 via bus 19.

In general, the agents 10-13 may each be executing a group of instructions according to a lumped in-order architecture or according to a lumped out-of-order architecture. The group of instructions can each include one or more memory operations (e.g., read, load, store, write, lock acquisition, etc.). The group of instructions can be demarcated by commit points (e.g., a commit ending one group of instructions can mark the beginning of the next group of instructions, which in turn ends at another commit). An instruction group is handled atomically (e.g., it is treated as a unit). An instruction (or instructions) in the group of instructions being executed by one of the agents 10-13 may seek access to a cache associated with any of the other agents 10-13.

In one embodiment, computer system 5 implements a cache coherency protocol such as, but not limited to, MESI (Modified, Exclusive, Shared, Invalid). According to the MESI protocol, a cache line is identified as being in one of the modified, exclusive, shared or invalid states. In the modified state, the cache line includes more recent information than main memory 18 (only the information in the cache line is valid because main memory 18 is not up to date), and no other cache holds the information in the cache line. In the exclusive state, the information in the cache line is not in any other cache and the information in the cache line is unmodified, and accordingly main memory 18 is up to date. In the shared state, the information in the cache line may be in one or more other caches, and main memory 18 is up to date. In the invalid state, the cache line does not contain valid information. MESI is consistent with sequential consistency.

Figure 2:
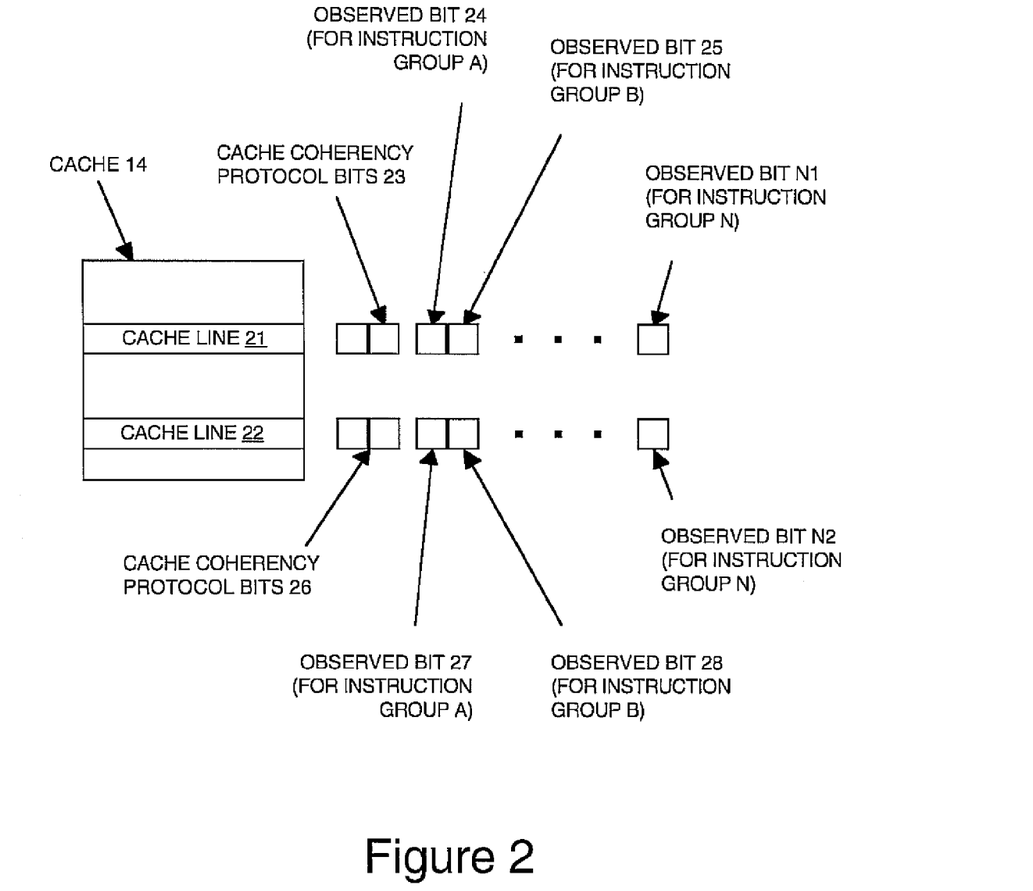
FIG. 2 is a block diagram of a cache and showing cache tags that are used according to one embodiment of the present invention.

FIG. 2 is a block diagram of cache 14 according to one embodiment of the present invention. Cache 14 includes a number of cache lines exemplified by cache lines 21 and 22.

In the embodiment of FIG. 2, a cache line tag is associated with each of the cache lines in cache 14. In one such embodiment, each cache line tag includes a number of cache coherency protocol bits. For example, cache coherency protocol bits 23 are associated with cache line 21, and cache coherency protocol bits 26 are associated with cache line 22. The cache coherency protocol bits 23 and 26 can be used to indicate the state of the cache lines 21 and 22, respectively, according to a cache coherency protocol such as the MESI protocol.

Furthermore, in the present embodiment, each cache line tag includes a number of additional bits referred to herein as observed bits for ease of discussion. For example, observed bits 24, 25, . . . , N1 are associated with cache line 21, and observed bits 27, 28, . . . , N2 are associated with cache line 22. The observed bits for cache 14 are associated with groups of instructions executed by the agent (e.g., processor 10) that is associated with cache 14. In one embodiment, each cache line tag is extended by one observed bit for each group of instructions that may be executed by processor 10 (FIG. 1) at the same time. If, for example, processor 10 can execute five (5) instruction groups in parallel, then the cache line tags are each extended by 5 observed bits.

In the example of FIG. 2, observed bits 24 and 27 (associated with cache line 21) are associated with instruction group A, and observed bits 25 and 28 (associated with cache line 22) are associated with instruction group B.

In one embodiment, an observed bit is set (e.g., set to a value of one) for a cache line in a cache if execution of an instruction in the group of instructions executed by the agent associated with that cache causes that cache line to be accessed (e.g., load, store, read, or write). For example, in one embodiment, observed bit 24 is set if an instruction in instruction group A, when executed by processor 10, causes cache line 21 to be accessed, because cache line 21 is in cache 14 associated with processor 10 (FIG. 1). In such an embodiment, observed bit 27 (also associated with instruction group A) is not set unless cache line 22 is also accessed because of instruction group A.

In general, with reference to FIGS. 1 and 2, a group of instructions executed by processor 10 may result in multiple cache lines in cache 14 being accessed. For each cache line in cache 14 accessed because of a group of instructions executed by processor 10, the observed bit corresponding to that group of instructions is set. However, an observed bit associated with a cache line in cache 14 is not set if an instruction executed on an external agent 11-13 causes access (e.g., a snoop or interrogation, or perhaps a read) to that cache line. For example, in one embodiment, an instruction executed by an agent other than processor 10 that causes cache line 21 to be accessed will not set an observed bit for cache line 21.

In one embodiment, when execution of a group of instructions is ended (e.g., the instruction group is committed, rolled back, or aborted), each observed bit set by that group of instructions is cleared (e.g., unset, or set to a value of zero). For example, if instruction group A is committed (or retired), rolled back or aborted, any of the observed bits 24 and 27 that are set are cleared. From another perspective, the observed bits associated with instruction group A, if set, remain set until the execution of instruction group A is ended.

To summarize, in one embodiment, when an agent (e.g., processor 10) begins to execute a group of instructions, it allocates an observed bit for that group of instructions to each cache line in the cache associated with the agent (e.g., cache 14 associated with processor 10). If a cache line (e.g., cache line 21) has been accessed because of an instruction in an instruction group (e.g., instruction group A) being executed by processor 10, then the observed bit for that cache line and corresponding to instruction group A (e.g., observed bit 24) is set. If another cache line (e.g., cache line 22) has also been accessed because of an instruction in instruction group A, then the observed bit for that cache line and corresponding to instruction group A (e.g., observed bit 27) is set. When execution of an instruction group is ended, the observed bits associated with that instruction group are cleared, and thus the observed bits are available for subsequent instruction groups executed by the agent. For example, if instruction group A is committed, rolled back or aborted, then observed bits 24 and 27 are cleared.

In one embodiment, the observed bits are used in the following manner. Continuing with reference to FIGS. 1 and 2, if an external agent (e.g., another processor 11 or 12 or a DMA agent such as peripheral device 13) executes an instruction that causes access to (or a request for access to) cache line 21, for example, and any of the observed bits 24, 25, . . . , N1 have been set, then the instruction groups associated with the observed bits that are set are forced to roll back and then reissue. Also, any of the observed bits 24, 25, . . . , N1 associated with cache line 21 that have been set are cleared. For example, if observed bits 24 and 25 have been set, then instruction group A (which corresponds to observed bit 24) and instruction group B (which corresponds to observed bit 25) are rolled back, and observed bits 24 and 25 are cleared. The rollback also clears the observed bits associated with other cache lines in cache 14 if those observed bits correspond to the groups of instructions that are rolled back. For example, if the instruction groups A and B are rolled back as mentioned above, then observed bits 27 and 28 are also cleared if those observed bits are set. The cache state transition occurs at this point, before the instruction groups A and B are reissued and are able to again cause cache line 21 (and perhaps cache line 22) to be accessed.

In general, if an external agent 11-13 accesses, or requests access to, a cache line in cache 14, and an observed bit associated with that cache line has been set, then all the observed bits that have been set for that cache line are cleared, all the instruction groups corresponding to the observed bits that are cleared are rolled back, and the observed bits associated with the instruction groups that are rolled back are also cleared for other cache lines in cache 14.

In one embodiment, the rollbacks just described occur only if an external agent 11-13 accesses, or requests access to, a cache line in cache 14, an observed bit associated with that cache line has been set, and the cache line is not in the shared state. Again consider an example in which an external agent (e.g., another processor 11 or 12 or a DMA agent such as peripheral device 13) executes an instruction that seeks access to cache line 21. In one embodiment, in addition to checking the observed bits 24, 25, . . . , N1 associated with cache line 21, the cache coherency protocol bits 23 are also checked to determine the state (e.g., the MESI state) of cache line 21. In a MESI embodiment, for example, if cache line 21 is in the shared state, and if the access from the external agent is for sharing (e.g., it is not exclusive), then access to cache line 21 can be granted without rolling back the instruction groups associated with the observed bits 24, 25, . . . , N1 that are set.

In one embodiment, observed bits that are set are not forgotten (e.g., cleared) except in the case of a rollback, commit or abort. In such an embodiment, a cache line that has at least one of its observed bits set is not replaceable, although the cache line and its set observed bit(s) can be moved to another location. This can lead to a situation in which a cache line is needed, but no cache lines are available (that is, all cache lines have at least one of their respective bits set, so none of the cache lines can be replaced or moved). In one embodiment, if such a situation arises, the group of instructions that needs the cache line, as well as following instruction groups, is rolled back and then reissued.

To prevent instruction groups from being repeatedly rolled back, in one embodiment, the number of times each instruction group is rolled back is counted and compared to a threshold. In such an embodiment, if the number of times an instruction group is rolled back exceeds the threshold, then the instruction group is rolled back for the last time. If it fails to execute to completion in the next attempt, the instruction group is reformed into a new instruction group that is reduced in size (e.g., one or more instructions is removed from the instruction group), and the counter for the new instruction group is set to zero. In the limiting case, the instruction group is eventually reduced to a single instruction that will be able to complete execution.

Figure 3:
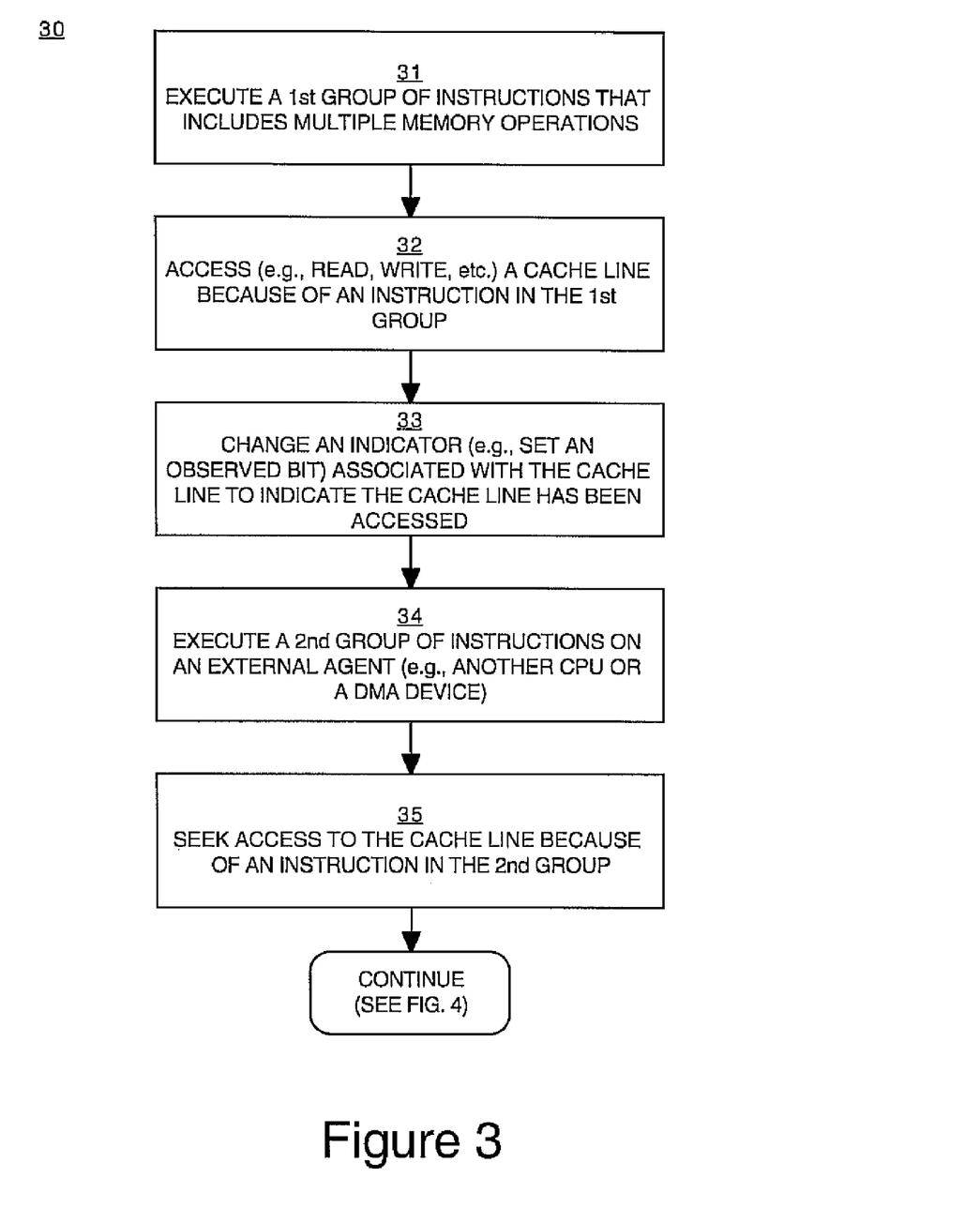
FIG. 3 is a flowchart of a method for managing memory in accordance with one embodiment of the present invention.
Figure 4:
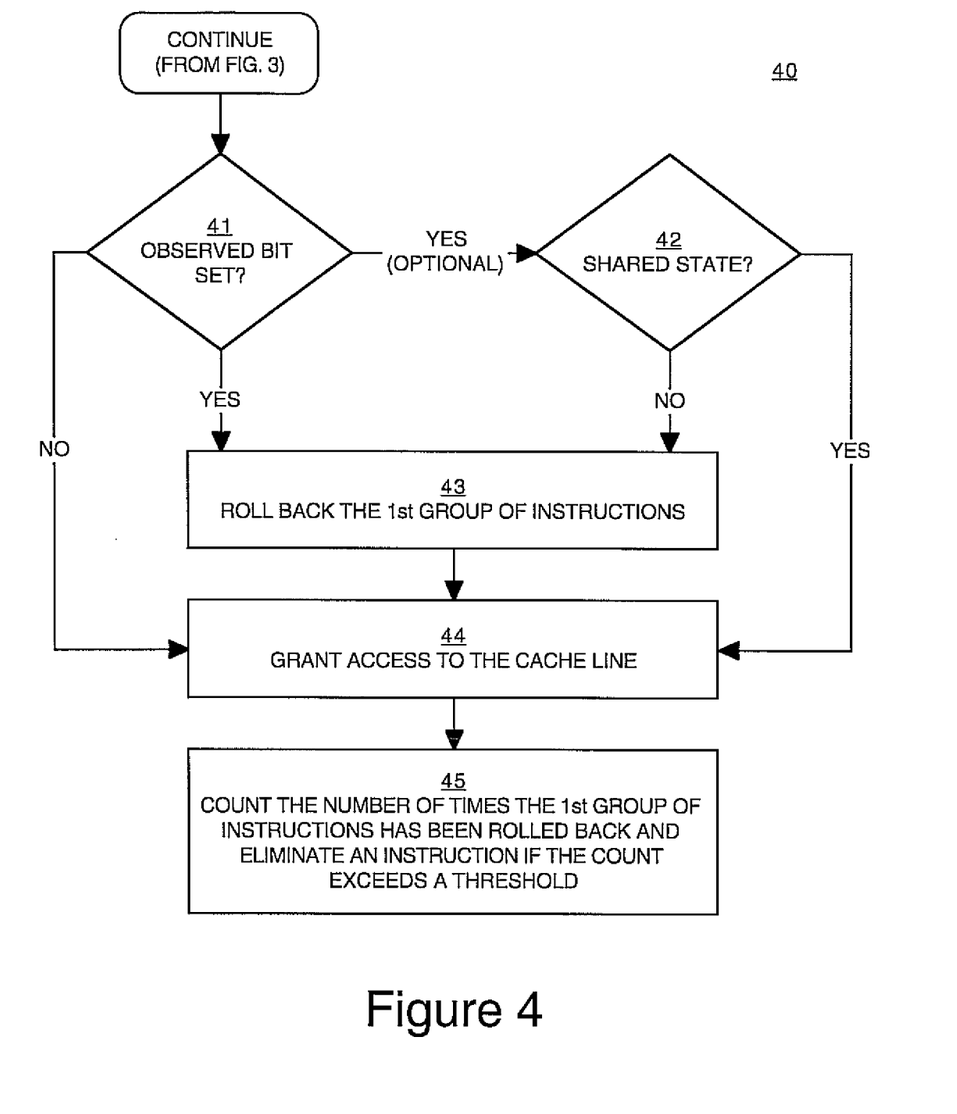
FIG. 4 is a flowchart that continues from the flowchart of FIG. 3.

FIGS. 3 and 4 are flowcharts 30 and 40 of a method for managing memory in accordance with one embodiment of the present invention (the flowchart of FIG. 4 is a continuation of the flowchart of FIG. 3). Although specific steps are disclosed in flowcharts 30 and 40, such steps are exemplary. That is, embodiments of the present invention are well-suited to performing various other steps or variations of the steps recited in flowcharts 30 and 40. It is appreciated that the steps in flowcharts 30 and 40 may be performed in an order different than presented, and that not all of the steps in flowcharts 30 and 40 may be performed. Some or all of the processes and steps of flowcharts 30 and 40 can be realized, in one embodiment, as a series of instructions that reside in hardware or software (e.g., in main memory 18 of FIG. 1) and are executed by one or more of the agents 10-13 in a computer system 5 (FIG. 1).

In step 31 of FIG. 3, a first group of instructions (e.g., instruction group A) is executed (e.g., by processor 10 of FIG. 1). In one embodiment, the first group of instructions includes multiple memory operations (e.g., reads, writes, loads, stores, lock acquisition, etc.). At least one of the instructions in the first group of instructions, when executed, causes a cache line (e.g., cache line 21 of FIG. 2) in a cache associated with processor 10 (e.g., cache 14) to be accessed (e.g., read, written, etc.).

In step 32 of FIG. 3, and continuing with reference to FIG. 2, that instruction is executed, causing cache line 21 to be accessed.

In step 33 of FIG. 3, with reference also to FIG. 2, an indicator associated with the first group of instructions is changed, in order to indicate that cache line 21 has been accessed because of the first group of instructions. In one embodiment, the indicator is also associated with cache line 21. In one embodiment, a bit (e.g., observed bit 24) associated with cache line 21 and the first group of instructions is set. In one embodiment, cache line 21 is indicated as having been accessed (that is, for example, the observed bit remains set) until execution of the first group of instructions is ended (e.g., because of a roll back, commit or abort).

In step 34 of FIG. 3, with reference also to FIG. 1, a second group of instructions is executed by an agent external to processor 10 (e.g., processor 11 or 12 or a DMA agent such as peripheral device 13). At least one of the instructions in the second group of instructions, when executed, causes (or will cause) the cache line of interest (e.g., cache line 21 of FIG. 2) to be accessed.

In step 35 of FIG. 3, access to the cache line of interest (e.g., cache line 21 of FIG. 2) is sought because of the second group of instructions. As will be seen, the first group of instructions is then handled depending on whether or not cache line 21 has been accessed because of the first group of instructions and is identified as having been accessed (e.g., by an observed bit). That is, it is possible that cache line 21 is accessed because of the second group of instructions before it is accessed because of the first group of instructions.

In step 41 of FIG. 4, with reference also to FIG. 2, a determination is made with regard to whether or not the cache line of interest (e.g., cache line 21) has been accessed because of the first group of instructions. In one embodiment, if the observed bit (e.g., observed bit 24) associated with cache line 21 and the first instruction group is set, then flowchart 40 proceeds to step 43, and otherwise flowchart 44 proceeds to step 44. In another embodiment, if the observed bit (e.g., observed bit 24) associated with cache line 21 and the first instruction group is set, then flowchart 40 proceeds to step 42.

In step 42 of FIG. 4, and with reference to FIG. 2, a determination is made with regard to whether or not cache line 21 is in the shared state (e.g., according to the MESI protocol). If cache line 21 is in the shared state, then flowchart 40 proceeds to step 44, and otherwise flowchart 40 proceeds to step 43.

In step 43 of FIG. 4, with reference also to FIG. 2, the first group of instructions is atomically rolled back, and the observed bits 24, 25, . . . , N1 associated with cache line 21 are cleared. Other observed bits, associated with other cache lines in cache 14 and corresponding to the first group of instructions, are also cleared if they are set. For example, if observed bit 27 (which also corresponds to the first group of instructions) is set, then it is also cleared by the rollback of the first group of instructions. Also, other groups of instructions associated with any of the observed bits of cache 14 that are cleared are also rolled back. For example, if observed bit 25 is set, then it is cleared and the instruction group associated with observed bit 25 (e.g., instruction group B) is rolled back, which in turn results in observed bit 28 (which also corresponds to instruction group B) of cache line 22 being cleared.

In step 44 of FIG. 4, access to cache line 21 (FIG. 2) is granted.

In step 45 of FIG. 4, in one embodiment, the number of times that the first group of instructions has been rolled back is counted. If the number of times the first group of instructions has been rolled back exceeds a threshold, then one or more instructions are eliminated from the first instruction group. Specifically, in one embodiment, the first group of instructions is reissued, and if the next execution attempt results in another rollback, then the first instruction group is reduced by one or more instructions.

Figure 5:
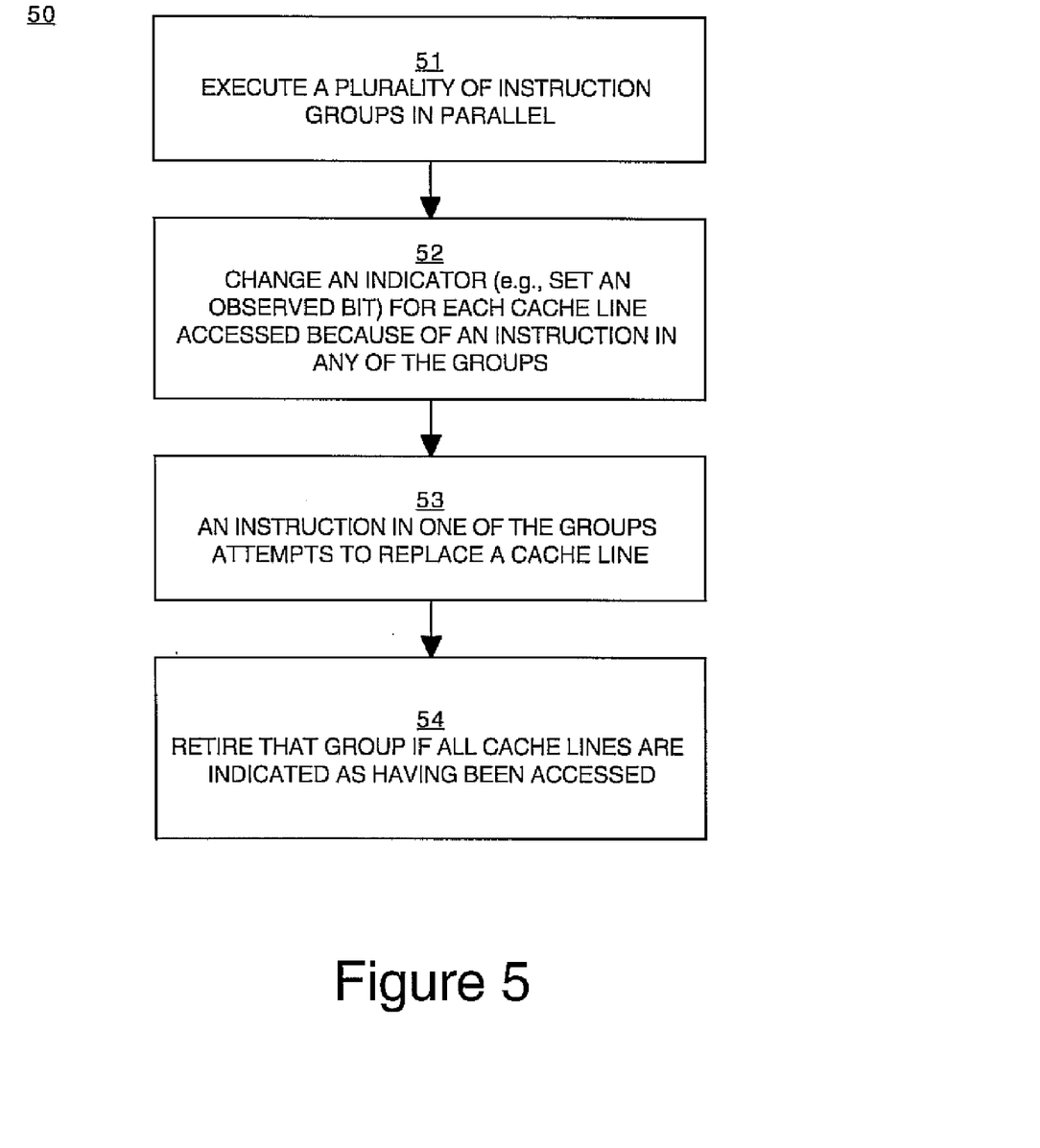
FIG. 5 is a flowchart of a method for replacing a cache line in accordance with one embodiment of the present invention.

FIG. 5 is a flowchart 50 of a method for replacing a cache line in accordance with one embodiment of the present invention. Although specific steps are disclosed in flowchart 50, such steps are exemplary. That is, embodiments of the present invention are well-suited to performing various other steps or variations of the steps recited in flowchart 50. It is appreciated that the steps in flowchart 50 may be performed in an order different than presented, and that not all of the steps in flowchart 50 may be performed. Some or all of the processes and steps of flowchart 50 can be realized, in one embodiment, as a series of instructions that reside in hardware or software (e.g., in main memory 18 of FIG. 1) and are executed by one or more of the agents 10-13 in a computer system 5 (FIG. 1).

In step 51 of FIG. 5, a number of instruction groups are executed in parallel using processor 10 (FIG. 1), for example.

In step 52 of FIG. 5, with reference also to FIGS. 1 and 2, each cache line in the cache associated with processor 10 (e.g., cache 14) that is accessed because of the groups of instructions being executed in step 51 is indicated as being accessed. For example, as previously described herein, an observed bit can be set for each cache line accessed because of the groups of instructions of step 51.

In step 53 of FIG. 5, one of the instructions in one of the instruction groups attempts to replace a cache line.

In step 54, in one embodiment, if all of the cache lines in the cache of interest (e.g., cache 14) are indicated as having been accessed (e.g., at least one observed bit is set for each of the cache lines in cache 14, then the instruction group that has the instruction that attempted the cache line replacement (the instruction group of step 53) is rolled back.

In summary, methods and systems that can maintain sequential consistency for lumped (in-order or out-of-order) architectures are described. Significantly, embodiments in accordance with the present invention permit sequentially consistent, lumped architectures in which multiple memory operations can be included in instruction groups.

Embodiments in accordance with the present invention can incorporate variations to the features described above. For systems with large speculation ability (e.g., potentially 20 or more active instruction groups), the cost (e.g., the storage cost) of the associated number of observed bits can be reduced in various ways. For example, a protocol can be established in which any external snoop causes all active instruction groups to roll back and reissue after the cache line state transition. In effect, such a protocol acts as if there is a single observed bit that is always set, except during the period of inactivity after rollback, and so no additional storage is needed for the observed bit. Alternatively, instead of an observed bit per cache line per instruction group, there can be an observed bit per instruction group.

Furthermore, new hardware structures can be added to track which cache lines have been accessed, without the storage of data. These hardware structures can be direct-mapped, set-associative, or fully-associative and of varying capacity.

Also, instead of having an observed bit per cache line per instruction group, a smaller memory structure (e.g., another cache, or a memory structure within main memory) that covers the whole cache address space and that has an observed bit per entry and per instruction group can be used. Each entry covers some portion of the cache address space, in such a way that every cache line address maps uniquely to an entry, but an entry maps to many cache lines. For example, some subset of the address bits of a cache line can be used to identify an entry. The subset of the address bits are the address summary. When accessing a cache line, the entry corresponding to the address summary for the cache line is used to set the observed bits. Similarly, on a snoop request, the address is "summarized," and the entry corresponding to the summary is examined for the presence of observed bits. The observed bits are cleared when an instruction group is committed, rolled back, or aborted. To illustrate, consider a cache complex where each cache holds 32 bytes, so that, for example, the bottom five bits (bits 4-0) of an address indicate bytes within the same cache line. Furthermore, consider a 32-entry observed bit structure, where bits 9-5 of the cache line address are used to select an entry, and this entry holds the observed bits. Then, any two addresses that have the same bits 9-5 will use the same entry in the summary structure; that is, they collide. This can mean that when a snoop comes, an instruction group that did not really conflict may be rolled back, because there is a conflict/collision in the summary structure even though there would not have been a conflict/collision in the cache. Thus, there is a tradeoff between the size of the summary structure and the overhead incurred by the "spurious" rollbacks due to collisions.

Embodiments in accordance with the present invention are thus described. While the present invention has been described in particular embodiments, it should be appreciated that the present invention should not be construed as limited by such embodiments, but rather construed according to the below claims.

What is claimed is:

1. A method of managing memory in a computer system, said method comprising:
   executing a first group of instructions on a first processor, wherein said first group of instructions comprises multiple memory operations and a first instruction that when executed causes a cache line of a cache memory to be read;
   in response to said first instruction causing said cache line to be read, setting a first bit of an indicator associated with said cache line to indicate that said cache line has been read, wherein said cache line is so indicated as having been read until execution of said first group of instructions is ended, wherein multiple groups of instructions are executable in parallel by said first processor and wherein said indicator comprises a bit for each group in said groups of instructions;
   executing a second group of instructions on said first processor, wherein said second group of instructions comprises multiple memory operations and a second instruction that when executed causes said cache line to be read; and
   in response to said second instruction causing said cache line to be read, setting a second bit of said indicator while said first bit remains set to indicate said cache line has been accessed by both said first group and said second group of instructions.

2. The method of claim 1 further comprising:
   executing a third group of instructions, wherein said third group of instructions includes a third instruction that when executed causes said cache line to be accessed, and wherein said third group of instructions is associated with a thread executing on an agent external to said first processor;
   in response to said third instruction seeking access to said cache line, using a value of said indicator to determine whether said cache line has been read and generating a result thereof; and
   handling said first group and said second group of instructions according to said result.

3. The method of claim 2 wherein said handling comprises rolling back said first group and said second group of instructions before granting said access provided said indicator indicates said cache line has been read by said first instruction and said second instruction, and otherwise granting said access without rolling back said first group and said second group of instructions.

4. The method of claim 3 wherein said handling further comprises:
   determining a state of said cache line, wherein said state is specified according to a cache coherency protocol comprising at least a modified state, a shared state and an invalid state; and
   rolling back said first group and said second group of instructions and then granting said access provided said cache line is in other than said shared state and said indicator indicates said cache line has been read by said first instruction and said second instruction, and otherwise granting said access without rolling back said first group and said second group of instructions only when said cache line is in said shared state.

5. The method of claim 3 further comprising maintaining a first count of how many times said first group of instructions has been rolled back and a second count of how many times said second group of instructions has been rolled back.

6. The method of claim 5 further comprising eliminating one or more instructions from said first group of instructions if said first count exceeds a threshold and eliminating one or more instructions from said second group of instructions if said second count exceeds said threshold.

7. The method of claim 2 wherein said agent is selected from the group consisting of: a second processor, and an input/output agent capable of direct memory access (DMA).

8. The method of claim 1 further comprising clearing said first bit when said execution of said first group of instructions is ended, wherein said second bit remains set until execution of said second group of instructions is ended.

9. The method of claim 1 further comprising:
   executing a plurality of groups of instructions in parallel;

changing an indicator associated with each cache line in said cache that has been accessed because of an instruction in any of said plurality of groups of instructions; and provided all cache lines in said cache memory are indicated as having been accessed, rolling back a group of instructions that includes an instruction that when executed attempts to replace information in a cache line of said cache memory, and otherwise continuing said executing of said plurality of groups of instructions.

10. A computer system comprising:
a first processor;
a cache memory used by said first processor; and
a memory unit coupled to said first processor, said memory unit containing instructions that when executed implement a memory management method, said method comprising:
  executing a first group of instructions using said first processor, wherein said first group of instructions includes multiple memory operations and a first instruction that when executed causes a cache line of said cache memory to be read;
  in response to said first instruction causing said cache line to be read, setting a first bit of an indicator associated with said cache line to indicate that said cache line has been read, wherein said cache line is so indicated as having been read until execution of said first group of instructions is ended, wherein multiple groups of instructions are executable in parallel by said first processor and wherein said indicator comprises a bit for each group of said groups of instructions being executed at a same time by said first processor;
  executing a second group of instructions using said first processor, wherein said second group of instructions comprises multiple memory operations and a second instruction that when executed causes said cache line to be read; and
  in response to said second instruction causing said cache line to be read, setting a second bit of said indicator while said first bit remains set to indicate said cache line has been accessed by both said first group and said second group of instructions.

11. The computer system of claim 10 wherein said method further comprises:
  executing a third group of instructions using an agent coupled to said cache memory, wherein said third group of instructions includes a third instruction that when executed causes said cache line to be accessed, and wherein said agent is external to said first processor;
  in response to said third instruction seeking access to said cache line, using a value of said indicator to determine whether said cache line has been read and generating a result thereof; and
  handling said first group and said second group of instructions according to said result.

12. The computer system of claim 11 wherein said agent is selected from the group consisting of: a second processor, and an input/output agent capable of direct memory access (DMA).

13. The computer system of claim 11 wherein said method further comprises rolling back said first group and said second group of instructions before granting said access provided said indicator indicates said cache line has been read by said first instruction and said second instruction, and otherwise granting said access without rolling back said first group and said second group of instructions.

14. The computer system of claim 13 wherein said method further comprises:
  determining a state of said cache line, wherein said state is specified according to a cache coherency protocol comprising at least a modified state, a shared state and an invalid state; and
  rolling back said first group and said second group of instructions and then granting said access provided said cache line is in other than said shared state and said indicator indicates said cache line has been read by said first instruction and said second instruction, and otherwise granting said access without rolling back said first group and said second group of instructions only when said cache line is in said shared state.

15. The computer system of claim 13 wherein said method further comprises maintaining a first count of how many times said first group of instructions has been rolled back and a second count of how many times said second group of instructions has been rolled back.

16. The computer system of claim 15 wherein said method further comprises eliminating one or more instructions from said first group of instructions if said first count exceeds a threshold and eliminating one or more instructions from said second group of instructions if said second count exceeds said threshold.

17. The computer system of claim 10 wherein said method further comprises clearing said first bit when said execution of said first group of instructions is ended, wherein said second bit remains set until execution of said second group of instructions is ended.

18. The computer system of claim 10 wherein said method further comprises:
  executing a plurality of groups of instructions in parallel on said first processor;
  changing an indicator associated with each cache line in said cache memory that has been accessed because of an instruction in any of said plurality of groups of instructions; and
  provided all cache lines in said cache memory are indicated as having been accessed, rolling back a group of instructions that includes an instruction that when executed attempts to replace information in a cache line of said cache memory, and otherwise continuing said executing of said plurality of groups of instructions.

19. A method of managing shared memory in a computer system, said method comprising:
  executing a first group of instructions on a first processor;
  associating a first state with a cache line in a cache comprising a plurality of cache lines, wherein said first state is specified according to a cache coherency protocol comprising at least a modified state, a shared state and an invalid state;
  associating a second state with said cache line during said executing of said first group of instructions, wherein said second state indicates that said cache line has been accessed because of a first instruction of said first group of instructions and wherein said second state is cleared when execution of said first group of instructions is ended, wherein multiple groups of instructions are executable in parallel by said first processor and wherein said second state comprises a bit for each cache line in said plurality of cache lines for each group in said groups of instructions;
  executing a second group of instructions on said first processor;
  associating a third state with said cache line during said executing of said second group of instructions, wherein said third state indicates that said cache line has been accessed because of a second instruction of said second group of instructions and wherein said third state is cleared when execution of said second group of instructions is ended, wherein said second state and said third state indicate said cache line has been accessed concurrently by both said first group and said second group of instructions.

20. The method of claim 19 wherein said first group and said second group of instructions each includes multiple memory operations.

21. The method of claim 19 further comprising:
executing a third group of instructions, wherein said third group of instructions includes a third instruction that when executed causes said cache line to be accessed and wherein said first group and said second group of instructions are is associated with respective threads executing on said first processor and wherein said third group of instructions is associated with a thread executing on an agent external to said first processor;
in response to said third instruction seeking access to said cache line, using said second state and said second state to indicate said cache line has been accessed because of said first instruction and said second instruction; and
rolling back said first group and said second group of instructions before granting said access.

22. The method of claim 21 wherein said rolling back is only performed provided said cache line is in other than said shared state.

23. The method of claim 21 further comprising maintaining a first count of how many times said first group of instructions is rolled back and a second count of how many times said second group of instructions is rolled back.

24. The method of claim 23 further comprising eliminating one or more instructions from said first group of instructions if said first count exceeds a threshold and eliminating one or more instructions from said second group of instructions if said second count exceeds said threshold.

25. The method of claim 21 wherein said agent is selected from the group consisting of: a second processor, and an input/output agent capable of direct memory access (DMA).

26. The method of claim 19 wherein said second state is indicated by setting a first bit associated with said cache line in response to said first instruction causing said cache line to be read, wherein said first bit is cleared when said execution of said first group of instructions is ended, and wherein said third state is indicated by setting a second bit associated with said cache line in response to said second instruction causing said cache line to be read, wherein said second bit is cleared when said execution of said second group of instructions is ended.

27. A computer system comprising:
a processor;
a cache memory coupled to said processor and having a plurality of cache lines; and
a memory unit coupled to said processor, wherein said memory unit has a plurality of entries and a plurality of indicator bits per entry, wherein a first indicator bit of said plurality of indicator bits is set to indicate that a cache line of said cache memory has been accessed because of a first instruction of a first group of instructions and wherein said first indicator bit is cleared when execution of said first group of instructions is ended, wherein a second indicator bit of said plurality of indicator bits is set to indicate that said cache line has been accessed because of a second instruction of a second group of instructions and wherein said second indicator bit is cleared when execution of said second group of instructions is ended, wherein said first and second indicator bits are both set to indicate said cache line has been accessed because of both said first instruction and said second instruction, and wherein each of said entries covers the address space of said cache memory such that a cache line maps uniquely to an entry but an entry maps to multiple cache lines, wherein multiple groups of instructions are executable in parallel by said processor and wherein said plurality of indicator bits comprises an indicator bit for each group in said groups of instructions for each cache line in said plurality of cache lines.

28. The computer system of claim 27 wherein a subset of address bits of said cache line is used to identify said entry, wherein in response to said cache line being accessed, an indicator bit of said entry corresponding to said subset of address bits is set.

* * * * *